May 14, 1929.  A. J. LEWIS  1,713,344
COMBINED AUTOMOBILE JACK AND TIRE PUMP
Filed Nov. 7, 1923
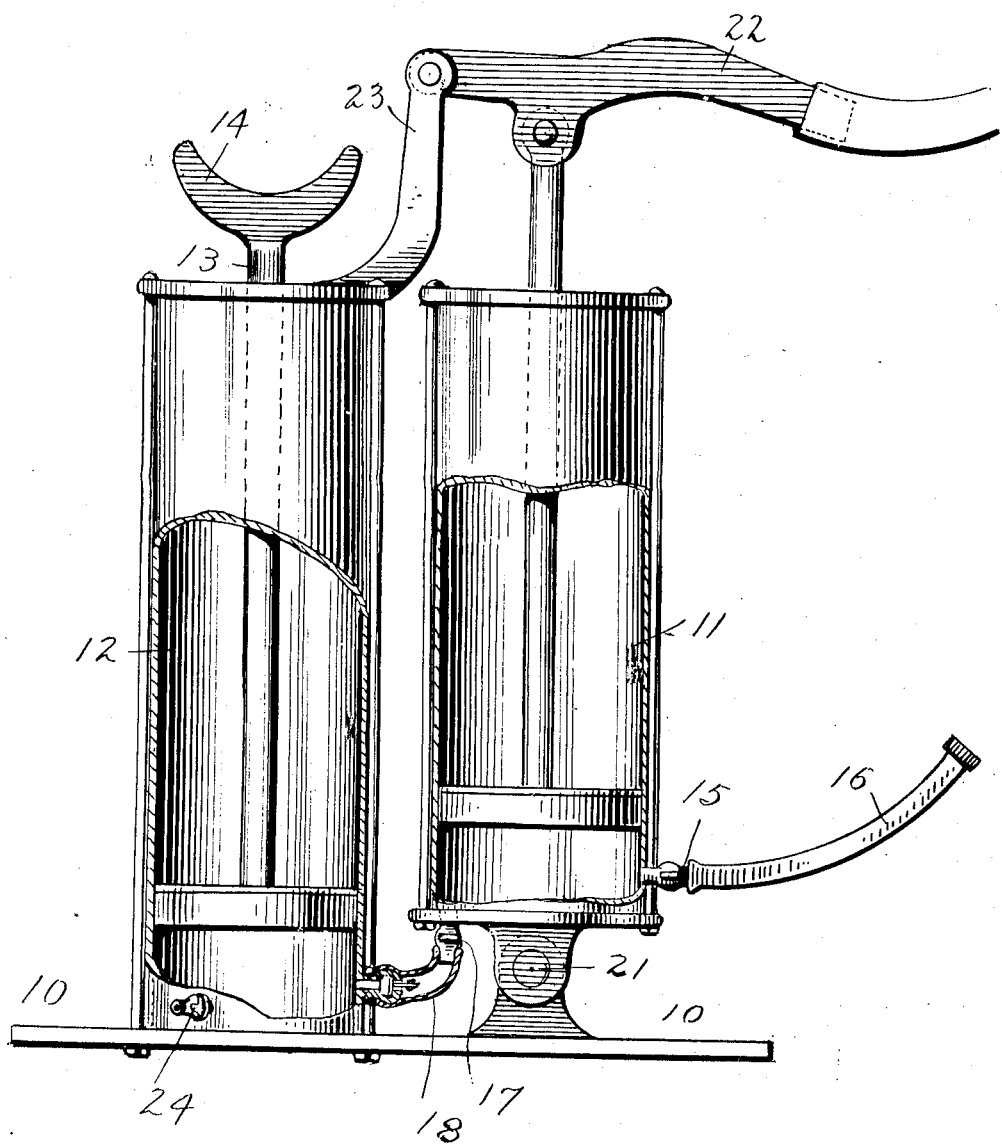

Patented May 14, 1929.

1,713,344

UNITED STATES PATENT OFFICE.

ALFRED J. LEWIS, OF POCAHONTAS, ARKANSAS.

COMBINED AUTOMOBILE JACK AND TIRE PUMP.

Application filed November 7, 1923. Serial No. 673,324.

By my invention I combine in a single or unitary device a tire pump and a pneumatic jack so that in effect two tools or appliances that are indispensable to automobile users are provided in one, and thus the cost and trouble of providing and caring for two separate and independent tools are avoided and there is the further advantage that less room is required for storage or keeping than is required for two separate tools. My invention consists in whatever is described by or is included within the terms or scope of the appended claim.

In the accompanying drawings:

The figure is a view partly in side elevation and partly in section of the combined appliance embodying my invention.

Describing in detail what is shown in the drawing I mount upon a single base, 10, which may be of any suitable material, iron for example side by side and as close together as possible an air pump, 11, consisting of a cylinder and a piston and a pneumatic jack, 12, which includes a cylinder and a piston, the piston rod, 13, of which above the top of the cylinder having a yoke or bracket, 14, for engagement with the car axle or any other part which is to be raised. The air pump, 11, near the bottom has an outlet through a cut-off cock, 15, to a hose, 16, having at its free end a coupling for attachment to the valve of a tire and also at its bottom it has a cut-off cock, 17, which by a piece of hose or flexible tubing, 18, is placed in communication with the cylinder of the jack, 12, below the piston thereof, the connection between the hose, 18, and such cylinder being a nipple, 19, which has a check valve, 20, (which may be a tire check valve) which permits pressure to be built up in the jack cylinder to lift the piston therein. The connection between the air pump and the jack is flexible because the pump at its bottom has a pivotal connection, 21, with the base, 10, to allow the pump to oscillate when its piston is reciprocated by the swinging movement of its handle, 22, which is pivoted to an arm, 23, on the top of the jack, 12. By utilizing the jack cylinder to support the pump arm or lever, 22, a simple and compact structure is produced.

It will be seen that the yoke or bracket, 14, of the jack will remain in whatever position to which it is lifted by the pressure of air flowing into the cylinder of the jack and confined therein by the check valve, 20. When it is desired to lower the automobile or other object from its lifted position the air pressure beneath the jack piston is released by means of a release cock, 24, near the bottom of the jack.

When it is desired to use the pump to inflate a tire the cock, 17, is closed to shut off communication with the jack cylinder and the cock, 15, is opened to allow air to flow from the pump cylinder to the tire. When the jack is to be used the cock, 15, is closed to prevent the escape of air at that point and the cock 17, is opened to establish communication between the pump and the jack cylinder and, of course, the release cock, 24, is closed.

The cylinders of the pump and jack and the other parts may be made of any desired metal or material.

What I claim is:

The combination, in a unitary organization, of an air pump, a pneumatic jack, pump and jack being mounted side by side, a common support upon which pump and jack are mounted, pump and jack comprising cylinders that extend vertically from the support, the bottom of the pump cylinder being spaced above the support and the two cylinders being close together, the jack being fixedly secured to the support, openable and closable means for connection with a tire, controllable means of communication between pump cylinder and jack cylinder, a pivotal connection at the bottom of the pump cylinder with the common support, a flexible pipe connection between the pump cylinder bottom and the jack cylinder at the side next the pump cylinder, said connection extending downward from the pump cylinder bottom and then laterally in the space between the cylinder bottom and the support, said flexible connection being a short one, an arm projecting upward from the jack cylinder at the side next the pump cylinder, and an operating handle for the pump pivoted to the jack cylinder arm.

In testimony whereof I hereunto affix my signature.

ALFRED J. LEWIS.